(12) United States Patent
Pongo et al.

(10) Patent No.: US 12,084,009 B2
(45) Date of Patent: *Sep. 10, 2024

(54) MASTER CYLINDER FOR A BRAKING SYSTEM

(71) Applicant: Polaris Industries Inc., Medina, MN (US)

(72) Inventors: Harry Pongo, Gatzke, MN (US); James E. Kehren, Lake City, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,128

(22) Filed: Feb. 10, 2023

(65) Prior Publication Data

US 2023/0192051 A1   Jun. 22, 2023

Related U.S. Application Data

(63) Continuation of application No. 17/031,019, filed on Sep. 24, 2020, now Pat. No. 11,603,082.

(Continued)

(51) Int. Cl.
*B60T 11/16*   (2006.01)
*B60T 11/18*   (2006.01)
(Continued)

(52) U.S. Cl.
CPC .............. *B60T 11/16* (2013.01); *B60T 11/18* (2013.01); *B60T 11/30* (2013.01); *B60T 17/06* (2013.01);
(Continued)

(58) Field of Classification Search
CPC ... B60T 11/30; B60T 7/04; B60T 7/08; B60T 11/18; B60T 11/16
See application file for complete search history.

(56) References Cited

U.S. PATENT DOCUMENTS

| 1,567,982 A | 12/1925 | Pfeiffer |
| 1,606,224 A | 11/1926 | Hoeller |

(Continued)

FOREIGN PATENT DOCUMENTS

| CN | 101704396 A | 5/2010 |
| CN | 107406094 A | 11/2017 |

(Continued)

OTHER PUBLICATIONS

International Preliminary Report on Patentability issued by the International Searching Authority, dated Aug. 7, 2019, for International Patent Application No. PCT/US2018/024775; 19 pages.

(Continued)

*Primary Examiner* — Thomas E Lazo
(74) *Attorney, Agent, or Firm* — Faegre Drinker Biddle & Reath LLP

(57) ABSTRACT

A dual input master cylinder, comprising a housing having a first input, a piston base positioned within the housing, and a piston rod having a first end and a second end, the first end of the piston rod abutting the piston base and the second end of the piston rod acting as a second input of the dual input master cylinder, wherein the piston rod is capable of being spaced apart from the piston base.

20 Claims, 9 Drawing Sheets

Related U.S. Application Data

(60) Provisional application No. 62/907,292, filed on Sep. 27, 2019.

(51) Int. Cl.

| | | |
|---|---|---|
| *B60T 11/30* | (2006.01) | |
| *B60T 17/06* | (2006.01) | |
| B60T 7/04 | (2006.01) | |
| B60T 7/08 | (2006.01) | |
| B60T 11/22 | (2006.01) | |

(52) U.S. Cl.
CPC . *B60T 7/04* (2013.01); *B60T 7/08* (2013.01); *B60T 11/22* (2013.01)

(56) References Cited

U.S. PATENT DOCUMENTS

| | | | |
|---|---|---|---|
| 2,313,991 | A | 3/1943 | Fitch |
| 2,353,755 | A | 7/1944 | Price |
| 3,159,974 | A | 12/1964 | Rodgers |
| 3,436,917 | A | 4/1969 | Branson |
| 3,473,634 | A | 10/1969 | Strifler et al. |
| 3,486,591 | A | 12/1969 | Scheffler |
| 3,554,334 | A | 1/1971 | Shimano et al. |
| 3,750,857 | A | 8/1973 | Marschall et al. |
| 3,868,001 | A | 2/1975 | Yokoi |
| 3,885,392 | A | 5/1975 | Haraikawa |
| 3,960,030 | A | 6/1976 | Williams |
| 3,999,807 | A | 12/1976 | Haraikawa |
| 4,024,932 | A | 5/1977 | Fay |
| 4,161,239 | A | 7/1979 | Karasudani |
| 4,174,867 | A | 11/1979 | Oberthur |
| 4,176,886 | A | 12/1979 | Watanabe |
| 4,189,190 | A | 2/1980 | Luepertz |
| 4,239,294 | A | 12/1980 | Burgdorf |
| 4,274,518 | A | 6/1981 | Berisch |
| 4,289,359 | A | 9/1981 | Luepertz et al. |
| 4,440,452 | A * | 4/1984 | Burckhardt .............. B62L 3/08 188/106 R |
| 4,465,322 | A | 8/1984 | Hayashi |
| 4,494,800 | A | 1/1985 | Hayashi |
| 4,598,954 | A | 7/1986 | Hayashi |
| 4,979,367 | A | 12/1990 | Crescentini |
| 5,036,960 | A | 8/1991 | Schenk et al. |
| 5,219,211 | A | 6/1993 | Tsuchida et al. |
| 5,273,346 | A | 12/1993 | Tsuchida et al. |
| 5,363,943 | A | 11/1994 | Washita et al. |
| 5,372,408 | A | 12/1994 | Tsuchida et al. |
| 5,501,511 | A | 3/1996 | Wagner |
| 5,524,736 | A | 6/1996 | Korshak |
| 5,544,946 | A | 8/1996 | Toyoda et al. |
| 5,564,534 | A | 10/1996 | Toyoda et al. |
| 5,620,237 | A | 4/1997 | Iwashita et al. |
| 5,628,387 | A | 5/1997 | Schantzen |
| 5,971,499 | A | 10/1999 | Pape et al. |
| 6,092,877 | A | 7/2000 | Rasidescu et al. |
| 6,390,566 | B1 | 5/2002 | Matsuno |
| 6,407,663 | B1 | 6/2002 | Huggett |
| 6,478,103 | B1 | 11/2002 | Matsuura |
| 6,772,864 | B1 | 8/2004 | Luh |
| 6,793,295 | B2 | 9/2004 | Sakamoto |
| 6,802,400 | B2 | 10/2004 | Ohura |
| 6,814,413 | B2 | 11/2004 | Davison et al. |
| 6,817,434 | B1 | 11/2004 | Sweet |
| 6,835,904 | B2 | 12/2004 | Mcguire et al. |
| 6,883,630 | B2 | 4/2005 | Morin |
| 7,331,640 | B2 | 2/2008 | Koyama |
| 7,431,131 | B1 | 10/2008 | Chevalier |
| 7,695,074 | B2 | 4/2010 | Pongo |
| 8,000,870 | B2 * | 8/2011 | Dessouki ............ F16D 65/0006 701/48 |
| 8,251,461 | B2 * | 8/2012 | Atsushi ................ B60T 13/686 303/2 |
| 10,723,334 | B2 | 7/2020 | Pongo et al. |
| 11,603,082 | B2 * | 3/2023 | Pongo ..................... B60T 17/06 |
| 2002/0063010 | A1 | 5/2002 | Morin |
| 2002/0088661 | A1 | 7/2002 | Gagnon et al. |
| 2004/0011034 | A1 | 1/2004 | Batchelor et al. |
| 2004/0035629 | A1 | 2/2004 | Morin et al. |
| 2005/0183420 | A1 | 8/2005 | Dasilva |
| 2005/0228568 | A1 | 10/2005 | Hack et al. |
| 2006/0152071 | A1 | 7/2006 | Takeuchi |
| 2006/0185943 | A1 | 8/2006 | Takizawa et al. |
| 2007/0273200 | A1 | 11/2007 | Pongo |
| 2010/0304930 | A1 | 12/2010 | Poulin |
| 2011/0297462 | A1 | 12/2011 | Grajkowski et al. |
| 2011/0315459 | A1 | 12/2011 | Zuchoski et al. |
| 2016/0298744 | A1 | 10/2016 | Bujold et al. |
| 2018/0065465 | A1 | 3/2018 | Ward et al. |
| 2018/0257726 | A1 | 9/2018 | Bagnariol et al. |
| 2018/0281764 | A1 | 10/2018 | Pongo et al. |
| 2019/0185080 | A1 | 6/2019 | Bezeau-Tremblay et al. |
| 2019/0210577 | A1 * | 7/2019 | Cha ........................ B60T 11/20 |
| 2021/0094522 | A1 | 4/2021 | Kehren et al. |

FOREIGN PATENT DOCUMENTS

| | | |
|---|---|---|
| CN | 109466522 A | 3/2019 |
| DE | 102010031140 A1 | 1/2012 |
| EP | 995653 A2 | 4/2000 |
| EP | 1702822 A1 | 9/2006 |
| EP | 2868958 A1 | 5/2015 |
| FR | 2843349 A1 | 2/2004 |
| GB | 550450 A | 1/1943 |
| GB | 2264546 A | 9/1993 |
| JP | H10218071 A | 8/1998 |
| JP | 2014-148308 A | 8/2014 |
| TW | 484550 | 4/2002 |
| TW | 243401 | 9/2004 |
| TW | 247468 | 10/2004 |
| WO | 2007/139673 A2 | 12/2007 |
| WO | 2018/183452 A1 | 10/2018 |

OTHER PUBLICATIONS

International Preliminary Report on Patentability received for PCT Patent Application No. PCT/US2020/052482, mailed on Apr. 13, 2022, 18 pages.

International Search Report and Written Opinion issued by the International Searching Authority, dated Jul. 24, 2018, for International Patent Application No. PCT/US2018/024775; 10 pages.

International Search Report and Written Opinion received for PCT Patent Application No. PCT/US2020/052482, mailed on Dec. 10, 2020, 7 pages.

Invitation to Restrict or Pay Additional Fees, and, Where Applicable, Protest Fee, issued by the European Patent Office, mailed Apr. 4, 2019, for International Patent Application No. PCT/US2018/024775; 4 pages.

Office Action issued by the Canadian Intellectual Property Office, dated Jul. 30, 2020, for Canadian Patent Application No. 3,055,074; 3 pages.

* cited by examiner

MASTER CYLINDER FOR A BRAKING SYSTEM

CROSS-REFERENCE TO RELATED APPLICATIONS

The present application is a continuation of U.S. patent application Ser. No. 17/031,019, filed on Sep. 24, 2020, and entitled "MASTER CYLINDER FOR A BRAKING SYSTEM," which claims priority to U.S. Provisional Patent Application Ser. No. 62/907,292, filed on Sep. 27, 2019, and entitled "MASTER CYLINDER FOR A BRAKING SYSTEM," the complete disclosures of which are expressly incorporated by reference herein.

TECHNICAL FIELD OF THE DISCLOSURE

The present application relates to a braking system for a vehicle and, more particularly, to a master cylinder for a braking system.

BACKGROUND OF THE DISCLOSURE

Braking systems are used for on-road and off-road vehicles to provide braking power in response to a user input. In various braking systems, anti-lock braking systems ("ABS") may be used on vehicles to facilitate the braking power in response to the user input. For example, the user may depress a brake pedal and/or a hand lever, thereby enabling the ABS to facilitate braking of the vehicle. The ABS may be configured to facilitate braking of the front wheels, the rear wheels, or both the front and rear wheels.

In present braking systems, depression of the brake pedal and/or the hand lever may result in uneven application of braking force between the front and rear wheels, resulting in the need for larger brake calipers and increased costs to compensate for more braking force being applied to the front or rear wheels compared to the other. This uneven application may be a result of the current master cylinder design in these braking systems. As such, there is a need for a master cylinder which may allow for even application of braking force to the front wheels and the rear wheels when the braking system is engaged such that smaller brakes may be utilized.

SUMMARY OF THE DISCLOSURE

In one embodiment, a dual input master cylinder is provided comprising a housing having a first input, a piston base positioned within the housing, and a piston rod having a first end and a second end, the first end of the piston rod abutting the piston base and the second end of the piston rod acting as a second input of the dual input master cylinder, wherein the piston rod is capable of being spaced apart from the piston base.

In another embodiment, a braking system is provided comprising a hand brake member, a first master cylinder operably coupled to the hand brake member, a foot brake member, a dual input master cylinder operably coupled to the foot brake member and the hand brake member, the dual input master cylinder including a housing having a first input, a piston base positioned within the housing, a piston rod abutting the piston base, the piston rod capable of being spaced apart from the piston base within the housing, and an output positioned downstream of the piston rod and the piston base, and at least one splitter operably coupled to the dual input master cylinder.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
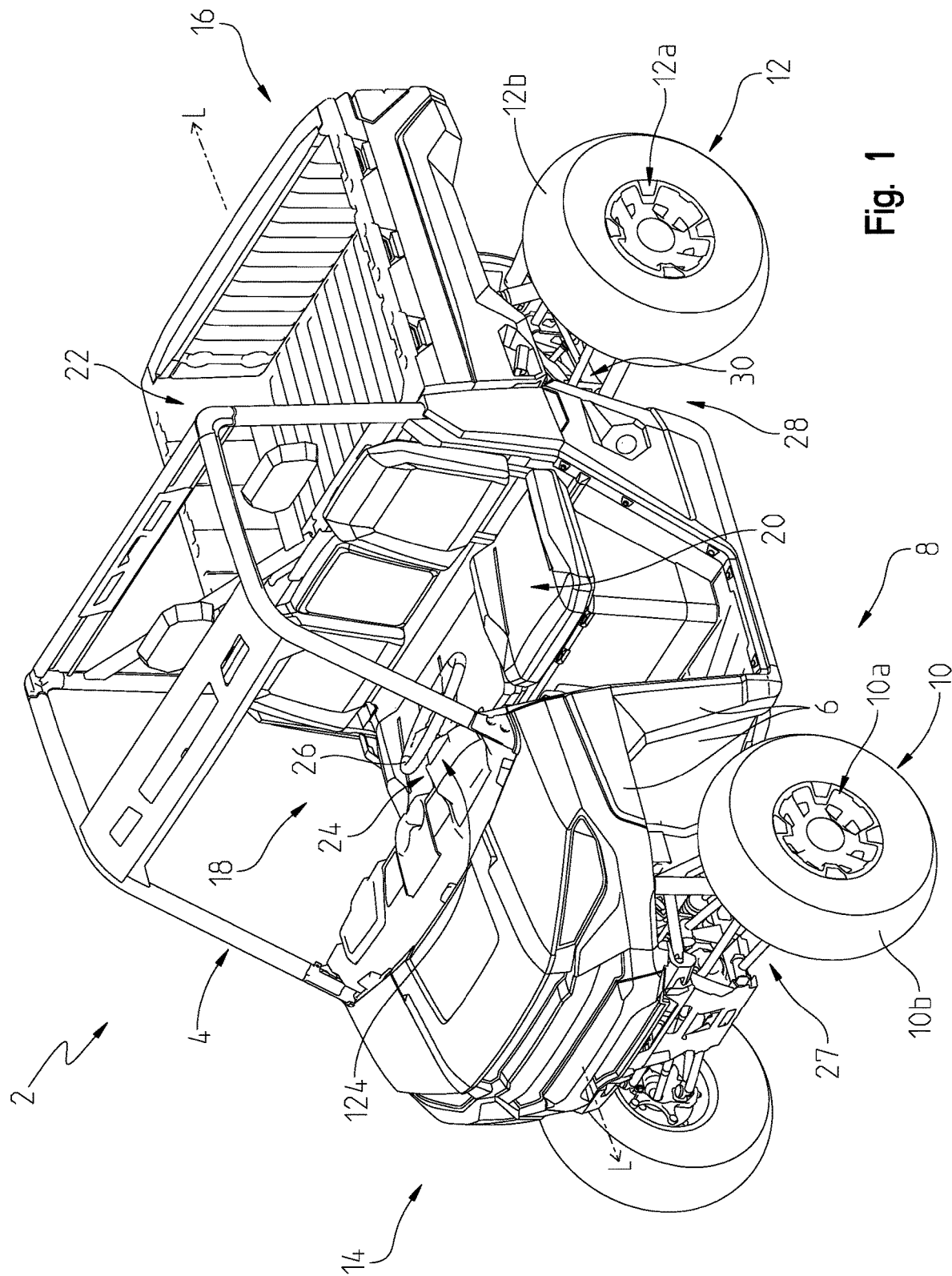
FIG. 1 shows a left front perspective view of a vehicle of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

As shown in FIG. 1, a vehicle 2 is disclosed and configured for off-road vehicle applications, such that vehicle 2 is configured to traverse trails and other off-road terrain. While vehicle 2 is shown as a utility vehicle ("UTV"), it is within the scope of the present disclosure that vehicle 2 may also be an all-terrain vehicle ("ATV") with a saddle seat and handlebars, an electric vehicle, a tractor, an automotive vehicle, or another type of power sports vehicle.

Vehicle 2 generally includes a frame assembly 4 which supports a plurality of body panels 6 and is supported on a ground surface by a plurality of ground-engaging members 8. Illustratively, ground-engaging members 8 include front ground-engaging members 10 and rear ground-engaging members 12. In one embodiment of vehicle 2, each of front ground-engaging members 10 include a wheel assembly 10*a* and a tire 10*b* supported thereon. Similarly, each of rear ground-engaging members 12 may include a wheel assembly 12*a* and a tire 12*b* supported thereon. A front suspension assembly 27 may be operably coupled to front ground-engaging members 10 and a rear suspension assembly 28 may be operably coupled to rear ground-engaging members 12.

Referring still to FIG. 1, vehicle 2 extends between a front end portion 14 and a rear end portion 16 along a longitudinal axis L and supports an operator area 18 therebetween. Operator area 18 includes seating 20 for at least the operator and also may support one or more passengers. In one embodiment, seating 20 includes side-by-side bucket-type seats while, in another embodiment, seating 20 includes a bench-type seat. A cargo area 22 is positioned rearward of operator area 18 and is supported by frame assembly 4 at rear end portion 16.

Figure 2A:
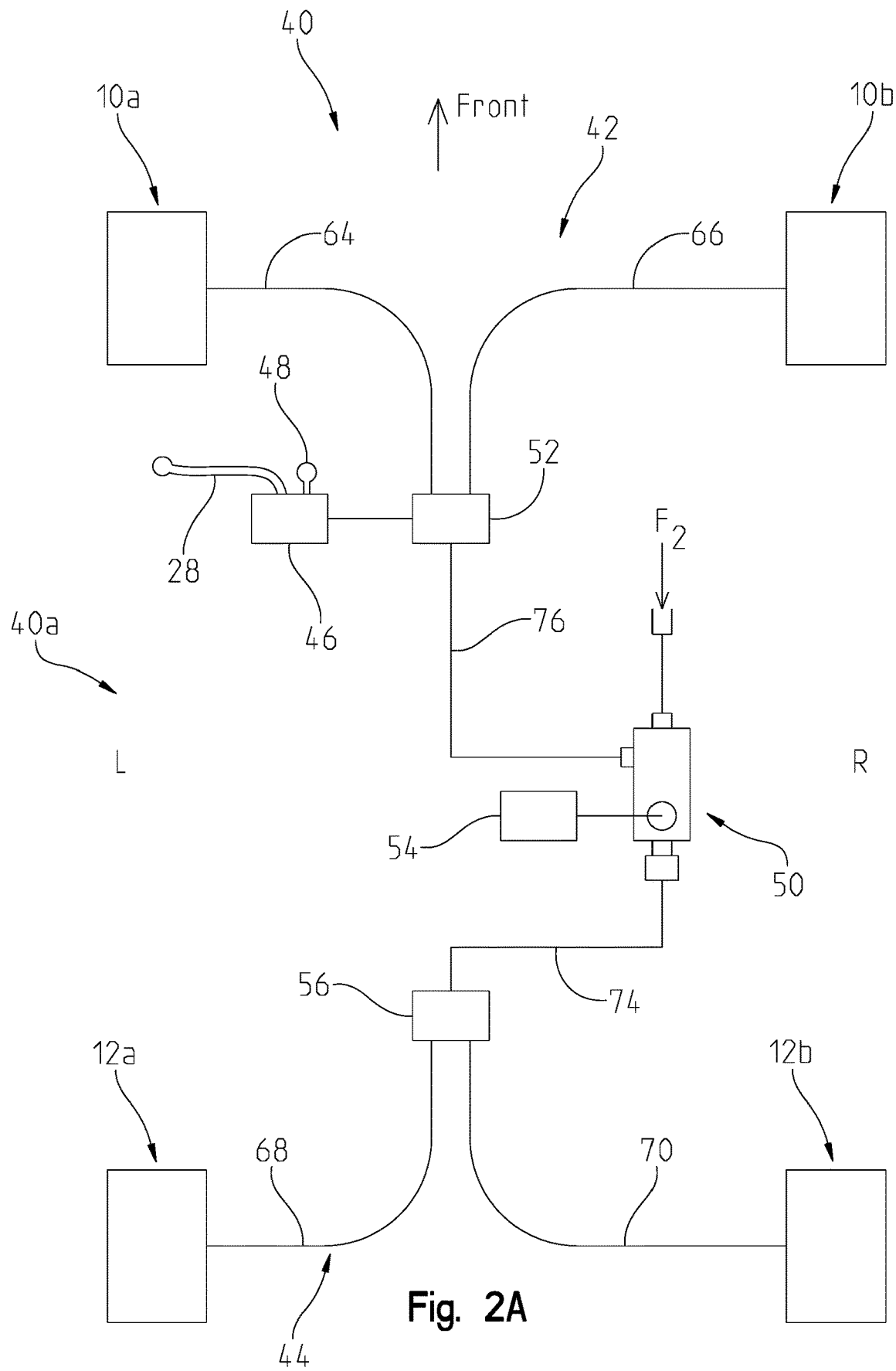
FIG. 2A shows a schematic view of a first embodiment of a braking control system of the present disclosure.

As shown in FIG. 1, operator area 18 includes operator controls 24, such as steering assembly 26, which may be operably coupled to one or more of ground-engaging members 8. Additional operator controls 24 may include other inputs for controlling operation of vehicle 2, as disclosed further herein, such as an accelerator member or pedal (not shown), a foot brake member or pedal (not shown), and/or a hand brake actuator 28 (FIG. 2A). More particularly, various operator controls 24 may affect operation of a powertrain assembly (not shown) of vehicle 2. The powertrain assembly may be supported by rear end portion 16 of vehicle 2 and generally includes an engine (not shown), a transmission (not shown) operably coupled to the engine, a front final drive member (not shown) operably coupled to front ground-engaging members 10 through front half shafts or axles (not shown), and a rear final drive member (not shown) operably coupled to rear ground-engaging members 12 through rear half shafts or axles (not shown). A drive shaft (not shown) may be operably coupled to the front final drive member at an input (not shown) for supplying motive power from the engine and/or transmission to front ground-engaging members 10. The rear final drive member is operably coupled the engine and/or transmission to supply power therefrom to rear ground-engaging members 12.

Figure 2B:
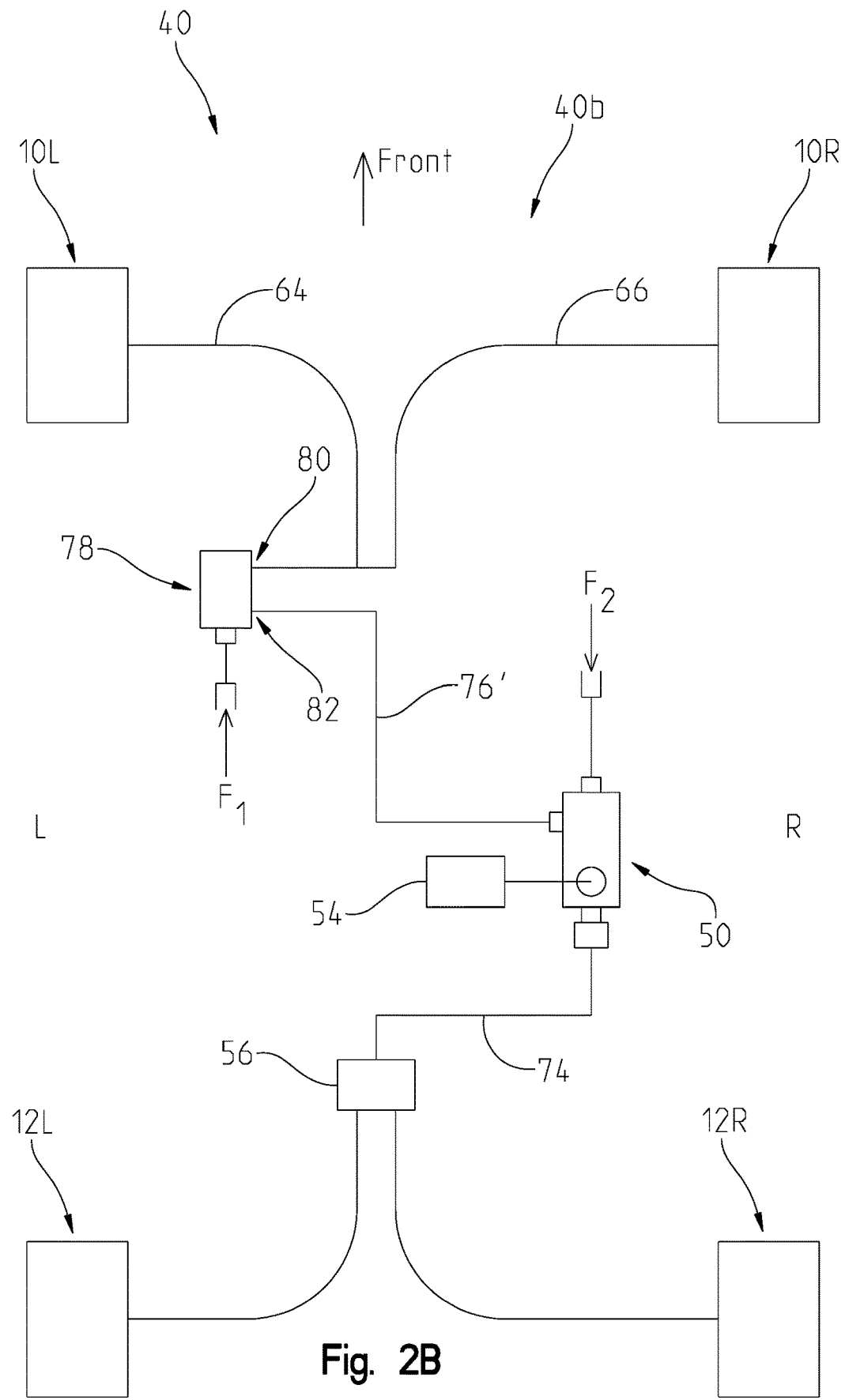
FIG. 2B shows a schematic view of a second embodiment of a braking control system of the present disclosure.
Figure 2C:
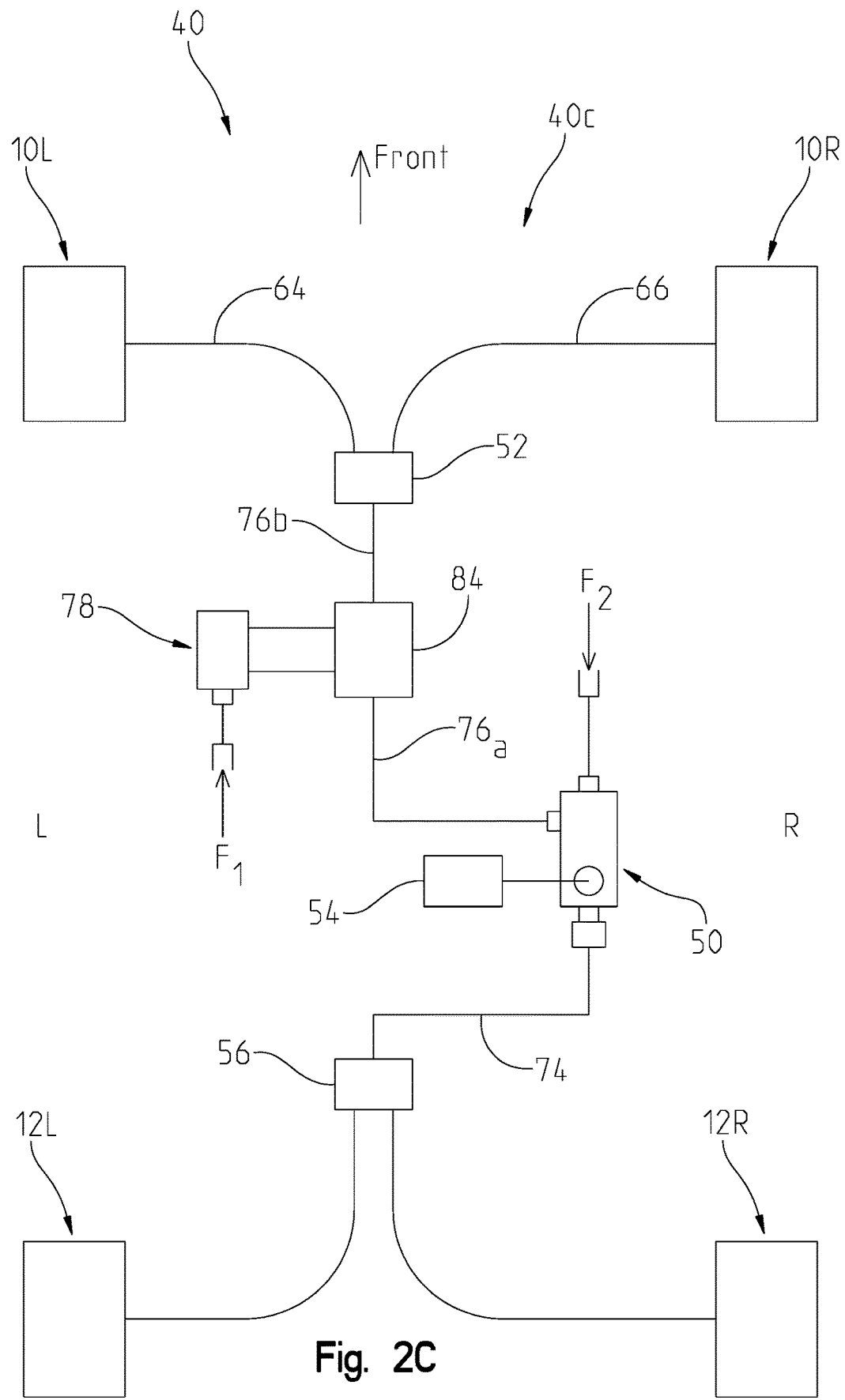
FIG. 2C shows a schematic view of a third embodiment of a braking control system of the present disclosure.

Referring now to FIGS. 2A-C, vehicle 2 includes a braking system 40, which includes a front end braking portion 42 and a rear end braking portion 44. Illustratively, front end braking portion 42 is positioned generally at front end portion 14 of vehicle 2 and is operably coupled to front ground-engaging members 10, while rear end braking portion 44 is positioned generally at rear end portion 16 of vehicle 2 and is operably coupled to rear ground-engaging members 12. Front end braking portion 42 includes front brake discs (not shown) and front brake calipers (not shown) operably coupled to front wheel assemblies 10*a*. Rear end braking portion 44 includes rear brake discs (not shown) and rear brake calipers (not shown) operably coupled to rear wheel assemblies 12*a*.

With reference to FIG. 2A, a schematic view of a first embodiment 40*a* of braking system 40 is generally shown which is configured to provide single-apply multiple wheel braking and a hydraulic lock mechanism. In this way, braking system 40*a* is configured to apply braking force to all ground-engaging members 10, 12 with a single input, as disclosed further herein. Braking system 40*a* includes a hand brake master cylinder 46 coupled to hand brake actuator 28 and a hydraulic lock mechanism 48 for providing a first input, a dual input master cylinder 50, 50', which may or may not be operably coupled to a braking control system (not shown), which may or may not include an anti-lock braking ("ABS") control module (not shown), and a foot brake member or pedal for providing a second input, a first splitter or junction member 52 configured to split the first input from hand brake master cylinder 46 between front ground-engaging members 10 and/or dual input master cylinder 50, 50', a hydraulic fluid reservoir 54 coupled to dual input master cylinder 50, 50' and configured to provide hydraulic fluid to dual input master cylinder 50, 50' when necessary, and a second splitter or junction member 56 configured to split an output from dual input master cylinder 50, 50' between rear ground-engaging members 12.

Illustratively, as shown in FIG. 2A, braking system 40*a* further includes a front left conduit or line 64, a front right conduit or line 66, a rear left conduit or line 68, and a rear right conduit or line 70 which are all fluidly coupled to dual input master cylinder 50, 50' through splitters 52 and 56. In this way, front left conduit 64 fluidly couples the brake caliper of front left ground engaging member 10L with dual input master cylinder 50, 50', front right conduit 66 fluidly couples the brake caliper of front right ground engaging member 10R with brake master cylinder 50, 50', rear left conduit 68 fluidly couples the brake caliper of rear left ground engaging member 12L with dual input master cylinder 50, 50', and rear right conduit 70 fluidly couples the brake caliper of rear right ground engaging member 12R with dual input master cylinder 50, 50'.

Referring still to FIG. 2A, with respect to rear end braking portion 44, conduits 68, 70 are fluidly coupled to dual input master cylinder 50, 50' through splitter or junction member 56. Illustratively, at least one junction conduit or line 74 extends from dual input master cylinder 50, 50' to junction member 56 such that dual input master cylinder 50, 50' is fluidly coupled with both of rear ground engaging members 12 through junction conduit 74 and respective rear left and right conduits 68, 70. Similarly, with respect to front end braking portion 42, conduits 64, 66 are fluidly coupled to dual input master cylinder 50, 50' through splitter member 52. Illustratively, at least one junction conduit or line 76 extends from splitter member 52 to dual input master cylinder 50, 50' such that hand brake master cylinder 46 is fluidly coupled to dual input master cylinder 50.

Referring now to FIG. 2B, a schematic view of a second embodiment 40*b* of braking system 40 of vehicle 2 is generally shown which is configured to provide single-apply multiple wheel braking with secondary braking and a hydraulic lock mechanism. Second embodiment 40*b* is substantially similar to first embodiment 40*a* of FIG. 2A except that first splitter 52 has been removed and force from hand brake member 28 (FIG. 2A) is provided to a tandem master cylinder 78 which has a first output 80 fluidly coupled to front ground engaging members 10 and a second output 82 fluidly coupled to dual input master cylinder 50, 50'. Additionally, second embodiment 40*b* includes conduit or line 76' coupling dual input master cylinder 50, 50' to tandem master cylinder 78 rather than first splitter 52 since first splitter 52 is removed.

With reference now to FIG. 2C, a schematic view of a third embodiment 40*c* of braking system 40 of vehicle 2 is generally shown which is configured to provide an additional brake device for monitoring circuit failure. Third embodiment 40c is substantially similar to second embodiment 40b except that third embodiment 40c includes first splitter 52 similar to first embodiment 40a and a pressure differential valve, switch, or combination valve 84 fluidly coupled to tandem master cylinder 78, dual input master cylinder 50, 50', and first splitter 52. Additionally, third embodiment 40c includes two lines 76a and 76b coupling dual input master cylinder 50, 50' to first splitter 52 through pressure differential switch 84. Specifically, a first of lines 76, 76a, couples dual input master cylinder 50, 50' to pressure differential switch 84 and a second of lines 76, 76b, couple pressure differential switch 84 to first splitter 52.

Figure 3:
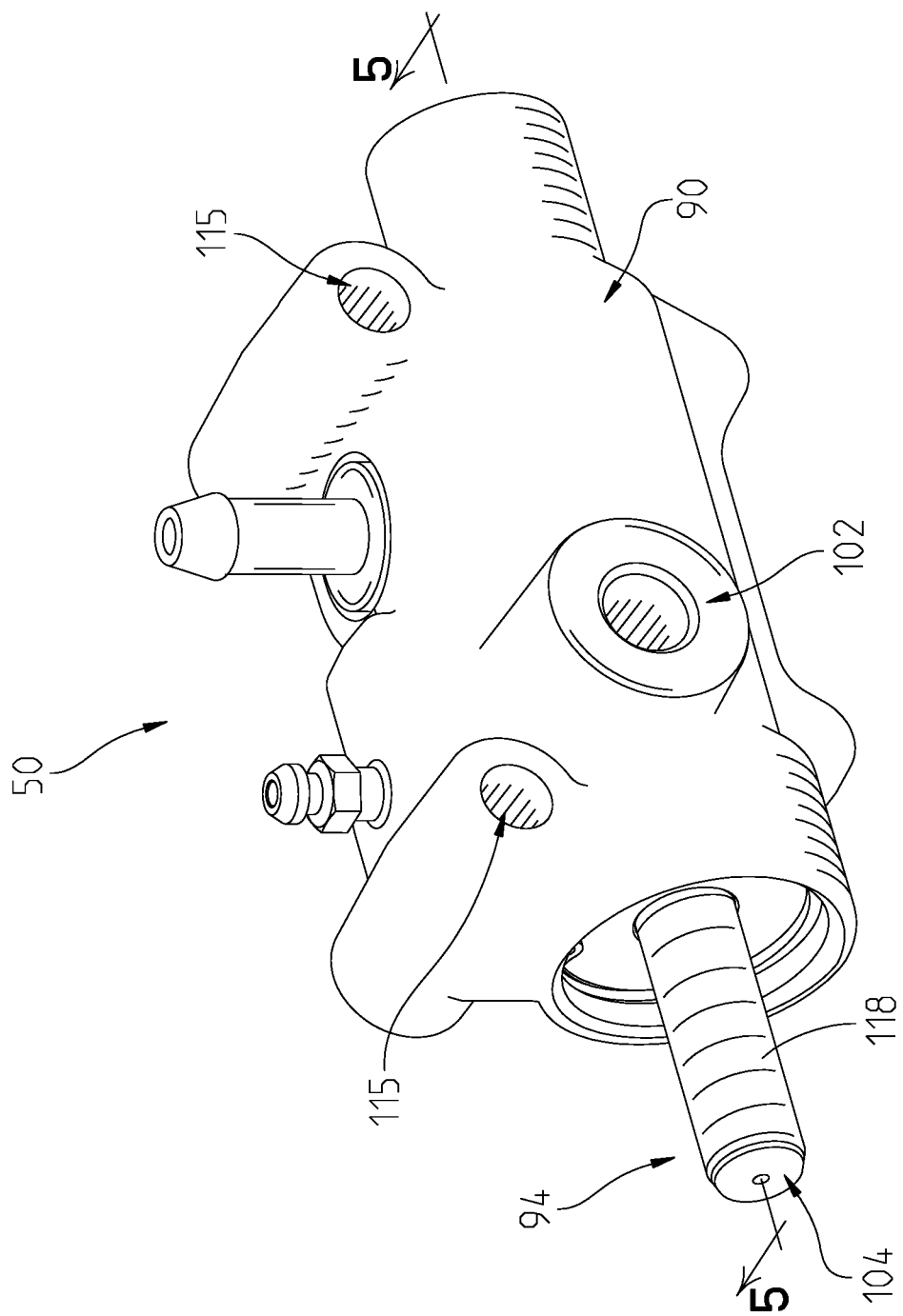
FIG. 3 shows a perspective view of a first embodiment of a dual input master cylinder of the present disclosure.
Figure 4:
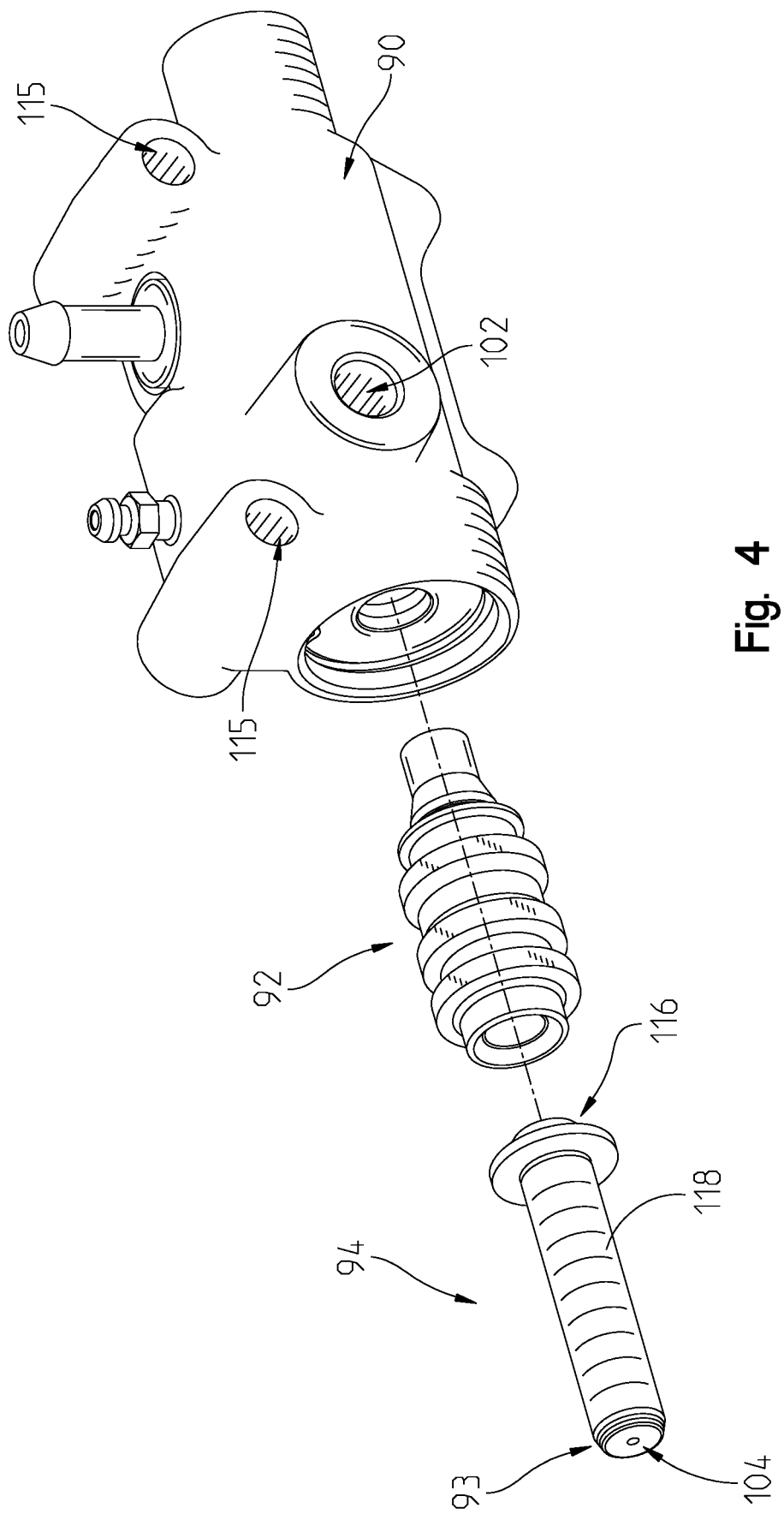
FIG. 4 shows an exploded view of the dual input master cylinder of FIG. 3.
Figure 5:
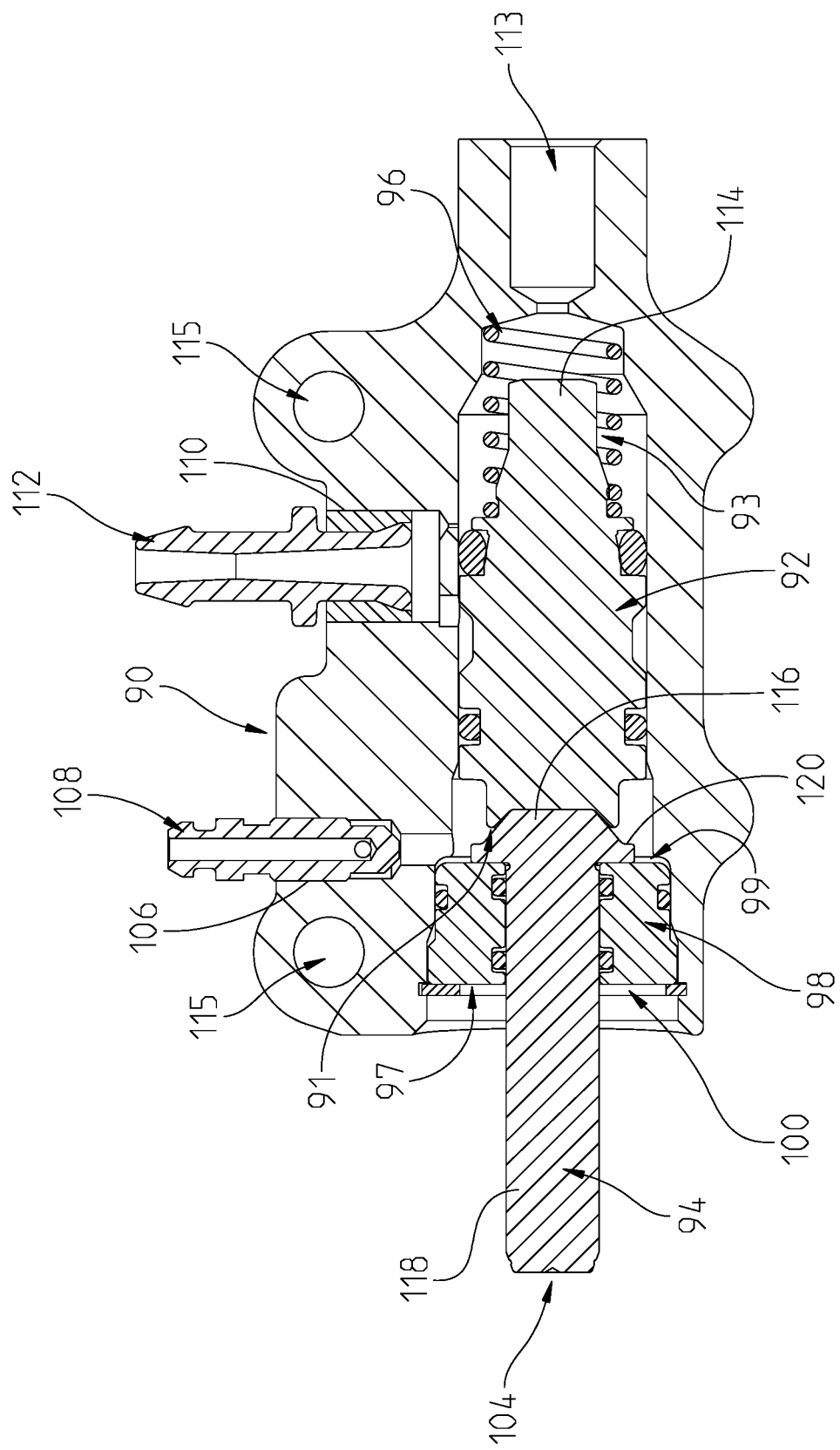
FIG. 5 shows a cross sectional view of the dual input master cylinder of FIG. 3 taken along line 5-5 of FIG. 3.

Referring now to FIGS. 3-5, a first embodiment 50 of dual input master cylinder is shown in detail. In general, dual input master cylinder 50 includes a housing 90, a piston base 92 (FIGS. 4 and 5) positioned within housing 90, a piston rod 94 abutting piston base 92, a biasing member 96 (i.e., a piston return spring) (FIG. 5) received around a portion of piston base 92, an end cap 98 positioned within housing 90 around piston rod 94, and an internal retention member (e.g., a snap ring) 100 abutting a first end 97 of end cap 98 and configured to hold end cap 98 within housing 90.

Housing 90 generally includes a first input 102 (FIG. 3), a second input 104, a bleed screw opening 106 for receiving a bleed screw 108, a hydraulic fluid reservoir connector opening 110 configured to receive a hydraulic fluid reservoir connector 112, an output 113 configured to provide pressurized hydraulic fluid to splitter 56 and ultimately rear ground engaging members 12, and at least one, illustratively two, mounting holes 115. As shown, first input 102 of housing 90 may be located along a side surface of housing 90, such that a central axis of first input 102 is substantially perpendicular to a central axis of bleed screw opening 106. In addition, mounting holes 115 of housing 90 may be located along an upper surface of housing 90 or along the same surface as openings 106 and 108, as shown, while in other embodiments, mounting holes 115 may be located along a lower surface of housing 90 or along a surface opposite openings 106 and 108, such that the mounting holes do not interfere with inputs, etc. along the same surface. In various embodiments, hydraulic fluid reservoir connector 112 may be incorporated into housing 90 at 90 degrees, as shown, while in other various embodiments, connector 112 may be incorporated into housing 90 at other various degrees or bends, such as 45 degrees, to allow for various packaging constraints.

Piston base 92 generally includes a first end 91 abutting piston rod 94, and a second end 93 having an extension 114 received within biasing member 96. Piston rod 94 generally includes a head 116 in abutment with first end 91 of piston base 92 and a piston body 118 extending out of housing 90. Head 116 includes a collar 120 configured to abut a second end 99 of end cap 98. In this way, piston rod 94 is separate and distinct from piston base 92 such that dual input master cylinder 50 includes a two-piece piston assembly, rather than a one-piece assembly.

Figure 6:
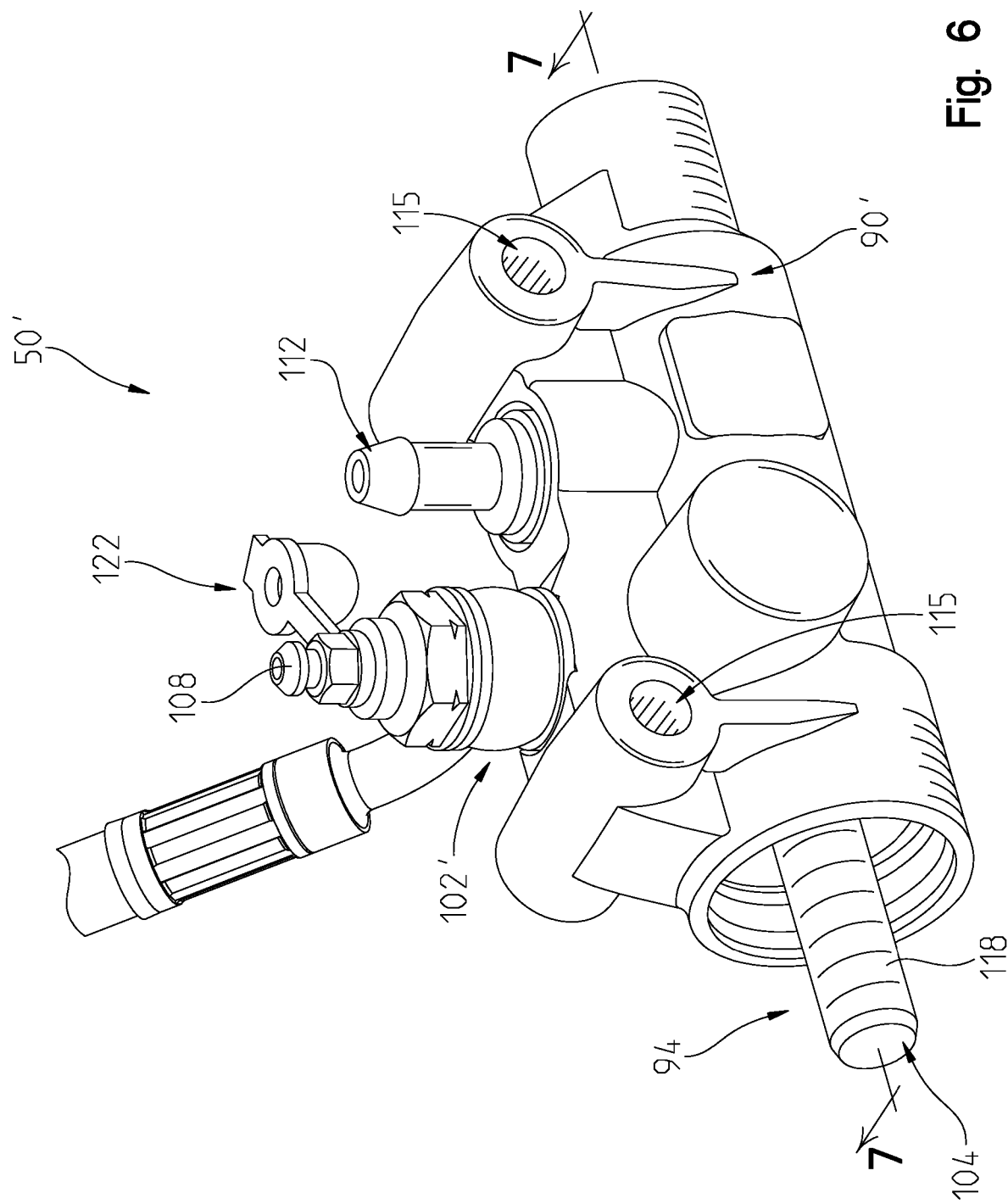
FIG. 6 shows a perspective view of a second embodiment of a dual input master cylinder of the present disclosure.
Figure 7:
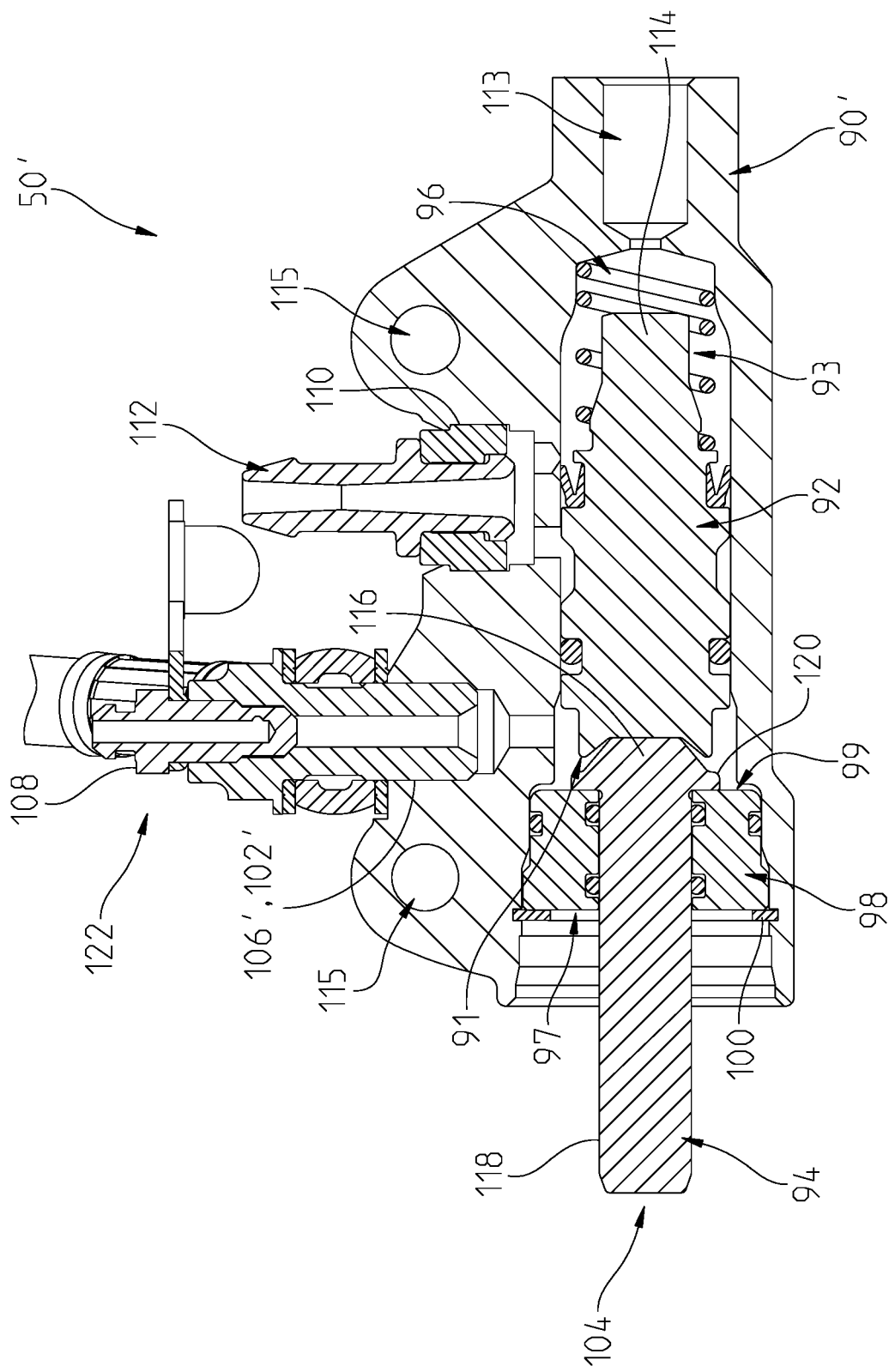
FIG. 7 shows a cross-sectional view of the dual input master cylinder of FIG. 6, taken along line 7-7 of FIG. 6.

With reference to FIGS. 6 and 7, a second embodiment 50' of dual input master cylinder is shown in detail. In general, dual input master cylinder 50' is substantially similar to dual input master cylinder 50 except that first input 102' of housing 90' of dual input master cylinder 50' coincides with bleed screw opening 106', such that a central axis of first input 102' is coaxial with a central axis of bleed screw opening 106'. A bleed assembly 122, such as a banjo bolt with bleeder screw 108, may be used along first input 102' such that the input and the bleed may coincide.

In operation, and referring to FIG. 2A or 2C as an example, as a force $F_1$ is applied to hand brake member 28 by the operator, pressurized hydraulic fluid is transmitted to splitter 52 and then at least partially to dual input master cylinder 50, 50' via pressurized hydraulic fluid. The pressurized hydraulic fluid enters dual input master cylinder 50, 50' via first input 102, 102' and causes piston base 92 to separate from piston rod 94. The separation of piston base 92 from piston rod 94 results in the entire surface of piston base 92 being exposed to the pressured hydraulic fluid causing piston base 92 to translate more force within housing 90 of dual input master cylinder 50, 50'. As such, the pressurized hydraulic fluid is forced out of output 113 of dual input master cylinder 50, 50' and to rear ground engaging members 12 more forcefully and more efficiently resulting in even braking of front and rear ground engaging members 10, 12.

In other words, the interface between head 116 of piston rod 94 and first end 91 of piston base 92 is separable such that the entirety of first end 91 piston base 92 is exposed to the pressurized hydraulic fluid. Because the hydraulic fluid from input 102, 102' is pressurized and is applied to the entire surface of first end 91, piston base 92 moves towards output 113 to provide hydraulic braking fluid to output 113 for braking rear ground-engaging members 12. As such, braking at rear ground-engaging members 12 occurs at approximately the same time and with the same braking pressure as applied to front ground-engaging members 10. Therefore, through dual input master cylinder 50, 50', the ratio of braking pressure applied to front ground-engaging members 10 to braking pressure applied to rear ground-engaging members 12 is approximately 1:1.

Referring again to FIGS. 2A-2C, additional or alternative force $F_2$ may be applied to dual input master cylinder 50, 50' via the foot brake member. When force $F_2$ is applied to the foot brake member, mechanical force is applied to second input 104 at a first end 93 of piston rod 94 such that piston rod 94 and piston base 92 both translate within housing 90 of dual input master cylinder 50, 50' and cause pressurized hydraulic fluid to be transmitted to rear ground engaging member 12 via output 113.

Additional details of braking assembly 40 may be disclosed in U.S. patent application Ser. No. 15/471,469, filed Mar. 28, 2017, and entitled "ANTI-LOCK BRAKE SYSTEM FOR ALL-TERRAIN VEHICLE", and U.S. patent application Ser. No. 16/197,497, filed Nov. 21, 2018, and entitled "ANTI-LOCK BRAKE SYSTEM FOR UTILITY VEHICLE", the complete disclosures of which is expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. A dual input master cylinder, comprising:
a housing having a first input;
an end cap;
a piston base positioned within the housing; and
a piston rod having a first end, a second end, a head, and
a collar extending outward from the head, the collar being configured to abut the end cap, the first end of the piston rod abutting the piston base and the second end of the piston rod acting as a second input of the dual input master cylinder, wherein the piston rod is capable of being spaced apart from the piston base.

2. The dual input master cylinder of claim 1, wherein the piston base is positioned entirely within the housing.

3. The dual input master cylinder of claim 1, further comprising an outlet, wherein a portion of the piston rod extends out of a first end of the housing and the outlet is positioned at a second end of the housing.

4. The dual input master cylinder of claim 1, further comprising:
   a biasing member, the biasing member being received around at least a portion of the piston base.

5. The dual input master cylinder of claim 1, wherein the first input is configured for transmitting a hydraulic input, wherein the hosing further comprises an output configured for transmitting a hydraulic output, and wherein the second input is configured for transmitting a mechanical input.

6. A dual input master cylinder, comprising:
   a housing having a first input and an outlet;
   a piston base positioned within the housing;
   a piston rod having a first end and a second end, the first end of the piston rod abutting the piston base and the second end of the piston rod acting as a second input of the dual input master cylinder, wherein the piston rod is capable of being spaced apart from the piston base; and
   a biasing member, the biasing member being received around at least a portion of the piston base.

7. The dual input master cylinder of claim 6, wherein the at least a portion of the piston base at which the biasing member is received is laterally opposed from where the piston rod is capable of being spaced apart from the piston base.

8. The dual input master cylinder of claim 6, further comprising an outlet, wherein a portion of the piston rod extends out of a first end of the housing and the outlet is positioned at a second end of the housing that is opposed from the first end.

9. The dual input master cylinder of claim 8, wherein the at least a portion of the piston base at which the biasing member is received defines an extension that extends toward the outlet.

10. The dual input master cylinder of claim 6, further comprising:
   a hydraulic fluid reservoir connector opening configured to receive a hydraulic fluid reservoir connector.

11. The dual input master cylinder of claim 6, wherein the piston base is positioned entirely within the housing.

12. A braking system, comprising:
   a first user input;
   a second user input;
   a dual input master cylinder operably coupled to the first and second inputs, the dual input master cylinder including:
      a housing having an output;
      a piston base positioned within the housing;
      a piston rod having a first end and a second end, the first end of the piston rod abutting the piston base and the second end of the piston rod receiving the second user input, wherein the piston rod is capable of being spaced apart from the piston base; and
      a biasing member, the biasing member being received around at least a portion of the piston base.

13. The braking system of claim 12, wherein the at least a portion of the piston base at which the biasing member is received is laterally opposed from where the piston rod is capable of being spaced apart from the piston base.

14. The braking system of claim 12, further comprising:
   at least one splitter operably coupled to the dual input master cylinder.

15. The braking system of claim 14, wherein the at least one splitter includes a first splitter and a second splitter, the first splitter positioned upstream of the first input and the second splitter positioned downstream of the output.

16. The braking system of claim 12, further comprising:
   a first master cylinder operably coupled to the first user input.

17. The braking system of claim 16, further comprising:
   a hydraulic fluid reservoir connector opening configured to receive a hydraulic fluid reservoir connector.

18. The braking system of claim 12, further comprising an outlet, wherein a portion of the piston rod extends out of a first end of the housing and the outlet is positioned at a second end of the housing.

19. The braking system of claim 18, wherein the at least a portion of the piston base at which the biasing member is received defines an extension that extends toward the outlet.

20. The braking system of claim 12, wherein the piston base is positioned entirely within the housing.

* * * * *